United States Patent
Bertin

(10) Patent No.: US 11,401,048 B2
(45) Date of Patent: Aug. 2, 2022

(54) AIRCRAFT LANDING AID VISUAL INDICATOR DEVICE AND METHOD FOR GUIDING AIRCRAFT LANDING

(71) Applicant: CALZONI S.R.L., Calderara di Reno (IT)

(72) Inventor: Daniele Maria Bertin, Milan (IT)

(73) Assignee: CALZONI S.R.L., Calderara di Reno (IT)

( * ) Notice: Subject to any disclaimer, the term of this patent is extended or adjusted under 35 U.S.C. 154(b) by 308 days.

(21) Appl. No.: 16/767,064

(22) PCT Filed: Nov. 27, 2018

(86) PCT No.: PCT/IB2018/059342
§ 371 (c)(1),
(2) Date: May 26, 2020

(87) PCT Pub. No.: WO2019/106529
PCT Pub. Date: Jun. 6, 2019

(65) Prior Publication Data
US 2020/0369407 A1    Nov. 26, 2020

(30) Foreign Application Priority Data
Nov. 29, 2017   (IT) .................... 102017000137484

(51) Int. Cl.
*B64F 1/18*    (2006.01)
*B60Q 1/00*    (2006.01)
(Continued)

(52) U.S. Cl.
CPC .............. *B64F 1/18* (2013.01); *B60Q 1/0023* (2013.01); *B60Q 1/307* (2013.01); *B63B 35/50* (2013.01); *G01S 17/08* (2013.01); *B60Q 2400/50* (2013.01)

(58) Field of Classification Search
CPC ...... B64F 1/18; B64F 1/00; B64F 1/20; B64F 1/04; B60Q 1/0023; B60Q 1/307;
(Continued)

(56) References Cited

U.S. PATENT DOCUMENTS 2,991,743 A * 7/1961 Ogle .................. B64F 1/20
356/138
3,003,146 A * 10/1961 Covely .................. G01S 7/20
315/11

(Continued)

FOREIGN PATENT DOCUMENTS

| EP | 2962928 A1 | 1/2016 |
|---|---|---|
| RU | 2376211 C2 | 1/2016 |

OTHER PUBLICATIONS

International Search Report dated Feb. 22, 2019 from counterpart PCT App No. PCT/IB2018/059342.

*Primary Examiner* — Eric Blount
(74) *Attorney, Agent, or Firm* — Shuttleworth & Ingersoll, PLC; Timothy J. Klima

(57) ABSTRACT

Described is a visual indicator device for landing aircraft on the deck of a ship, comprising a unit for measuring the instantaneous rolling motion angle of the ship, a light projection apparatus designed to project, on a non-horizontal wall of the ship, at least a first rectilinear segment representing the horizon line.

15 Claims, 3 Drawing Sheets

(51) Int. Cl.
*B60Q 1/30* (2006.01)
*B63B 35/50* (2006.01)
*G01S 17/08* (2006.01)

(58) Field of Classification Search
CPC ..... B60Q 2400/50; B63B 35/50; G01S 17/08; B63G 11/00; G01C 19/32
USPC ......................................................... 340/953
See application file for complete search history.

(56) References Cited

U.S. PATENT DOCUMENTS

| | | | |
|---|---|---|---|
| 3,516,375 A | | 6/1970 | Charlton et al. |
| 3,537,066 A | | 10/1970 | Stingl et al. |
| 3,843,263 A | * | 10/1974 | Snead ................. G08G 5/0021 244/114 R |
| 3,878,805 A | | 4/1975 | Stevenson |
| 4,995,722 A | * | 2/1991 | Sutour ..................... B64F 1/12 244/17.17 |
| 6,064,924 A | * | 5/2000 | Fleischmann ......... G01S 13/956 701/16 |
| 9,505,501 B2 | * | 11/2016 | Bertin ....................... B64F 1/20 |
| 9,944,405 B2 | * | 4/2018 | Mouton ................ B64D 47/06 |
| 2013/0134260 A1 | * | 5/2013 | Besenzoni ............... B64F 1/36 244/110 E |
| 2019/0248511 A1 | * | 8/2019 | Lewis ................... H05B 45/00 |

* cited by examiner

AIRCRAFT LANDING AID VISUAL INDICATOR DEVICE AND METHOD FOR GUIDING AIRCRAFT LANDING

This application is the National Phase of International Application PCT/IB2018/059342 filed Nov. 27, 2018 which designated the U.S.

This application claims priority to Italian Patent Application No. 102017000137484 filed Nov. 29, 2017, which application is incorporated by reference herein.

This invention relates to an aircraft landing aid visual indicator device.

The invention is applicable in particular in the landing decks for helicopters on ships, both for military and civil use.

This invention also relates to a method for guiding the landing of an aircraft.

This invention refers to aircraft in general terms, meaning primarily helicopters but also vertical take-off aircraft, which are, therefore, able to perform take-off and landing manoeuvres which are not unlike those of an actual helicopter.

Both in a military context and, increasingly, also in a civil context, the landing of helicopters is constantly seen on ships, on which, therefore, suitable areas are provided, normally on the aft deck.

In view of the strategic importance in many circumstances of the use of helicopters also in emergency operations, it is natural that the landing also occurs at night or in adverse weather conditions, such as with storms, rough seas or poor visibility.

According to the prior art, there are several visual aid systems for landing, for example by means of luminous elements.

The luminous elements are typically located at the edges of the landing platform of the ship and provide the pilot of the above-mentioned aircraft with a multiplicity of operational information, such as, for example, the physical boundaries of the obstacles, the reference of the horizon and warning lights signalling the operational status.

With regard to the reference of the horizon, this is particularly important in order to provide the pilot with the perception of the virtual plane of the horizon which otherwise, due to the rolling motion of the ship, the pilot would easily lose.

In the prior art, the position of the above-mentioned luminous elements is usually fixed and, in the case of the indication of the horizon line, it is anchored to a horizontal reference moved mechanically by an electric motor whose movement is designed to compensate for the angles of rolling motion of the ship.

Alternatively, for the horizon signal, it is known to vary the angle of inclination of the visual aid systems by means of the arrangement of the above-mentioned luminous elements at different angles, switching ON elements with different angles with the variation of the actual rolling motion angles of the ship.

The prior art visual aid landing devices, with regard to common landing practices, are not always found to be efficient and able to adequately support the work of the pilot.

A first drawback of the prior art devices is the high operational work load which it causes the aircraft pilot.

In effect, the distributed positioning on the surface of the prior art devices does not favour the concentration of the pilot, forcing the pilot to pay attention to many different indications located even at some distance from one another.

More specifically, the pilot of the above-mentioned aircraft is forced to direct his/her attention between various points, including the aircraft instrumentation panel, the structure of the ship, the visual aid systems (such as the above-mentioned luminous elements), etc.

Another drawback linked to the aid devices of known type is due to the fact that the information provided by them is not always perfectly visible and understandable by the pilot if he/she not in a predetermined optimum position.

In other words, it may be difficult for the pilot to visualize clearly the information provided by these devices in each position adopted by the aircraft.

A further drawback connected to the prior art devices regards their installation. In effect, with reference, for example, to the indication of the horizon line, in both the above-mentioned embodiments the prior art devices require installation of numerous components directly on the structure of the ship.

For example, the electric motors for the first embodiment and a large number of luminous elements, for each angle of rolling motion operatively possible, for the second embodiment.

The aim of the invention is to provide a landing aid visual indicator device which overcomes the above-mentioned drawbacks and problems of the prior art.

More specifically, the aim of this invention is to provide a landing aid visual indicator device which is effective, practical to install and simple and intuitive to use.

Moreover, the aim of this invention is to provide a landing aid visual indicator device which is able to simplify the landing for the pilot.

The aim of this invention to also to provide a method for guiding the landing of an aircraft which is at the same time practical, effective and easy to implement.

The invention accordingly provides a landing aid visual indicator device and a method for guiding the landing of an aircraft comprising the features defined in any of the appended claims.

The technical features of the invention, with reference to the above aims, can be easily inferred from the appended claims, in particular claim 1, and preferably any of the claims that depend, either directly or indirectly, on claim 1.

The advantages of the invention will become more apparent from the detailed description which follows, with reference to the accompanying drawings which illustrate preferred embodiments of the invention provided merely by way of example without restricting the scope of the inventive concept, and in which.

Figure 1:
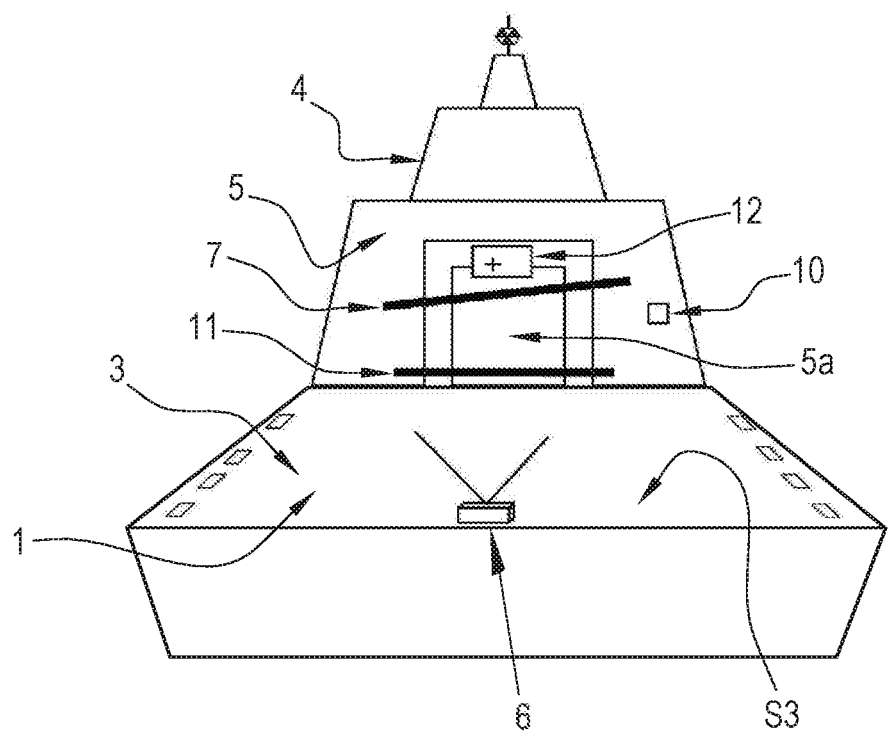
FIG. 1 is a schematic perspective view from above of a preferred embodiment of the aircraft landing aid visual indicator device made in accordance with this invention.
Figure 2:
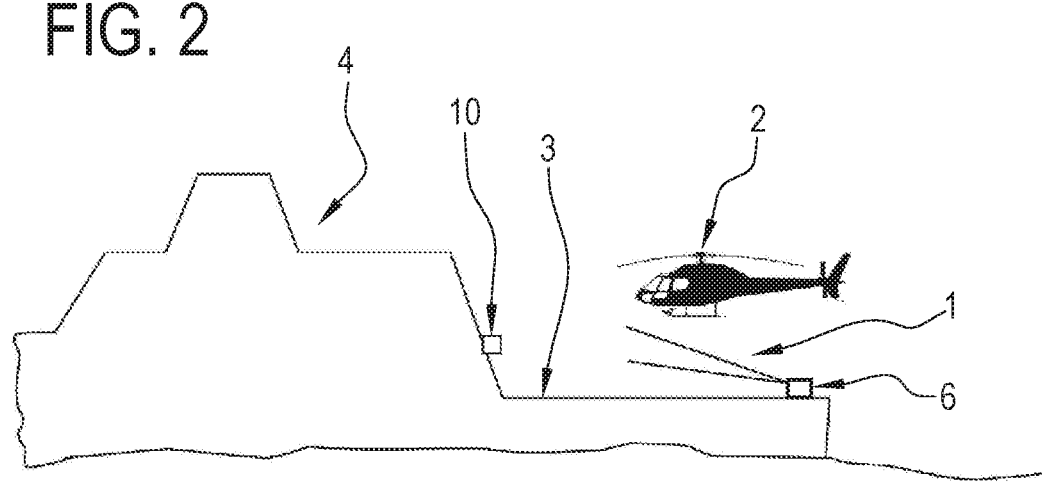
FIG. 2 is a schematic side elevation view of a ship on which the indicator device of FIG. 1 is installed.

As illustrated in FIGS. 1 and 2, the numeral 1 denotes visual indicator device for landing aircraft 2 on the deck 3 of a ship 4.

The term ship is used to mean, for the purposes of this invention, any ship, either civil or military, which is able, both in terms of dimensions and tonnage, to allow the landing of an aircraft 2.

By way of example, the aircraft is illustrated in the accompanying as a helicopter 2.

According to the invention, the reference numeral 2 refers without distinction to an aircraft or a helicopter.

The visual indicator device 1 for landing aircraft, hereinafter also referred to briefly as indicator device 1, is located at the deck 3 on which is defined a respective surface S3 for landing which is substantially flat and horizontal.

As illustrated in FIGS. 1 and 2, the above-mentioned landing surface S3 is normally delimited, on one of its sides, by a non-horizontal wall 5.

The expression "non-horizontal wall" is used to mean, for the purposes of the invention, a wall inclined relative to the above-mentioned surface S3, with a marked vertical component. In a limit configuration, not illustrated, the non-horizontal wall 5 is substantially vertical, that is to say, at a right angle relative to the landing surface S3.

As illustrated in FIG. 1, in accordance with a very common architecture, especially in the military context, a door 5*a* providing access to a hangar for positioning the aircraft 2 is formed on the above-mentioned wall 5.

Again with reference to FIG. 1, the indicator device 1 comprises a projector 6 of images designed to project, on the above-mentioned non-horizontal wall 5 of the ship 4, an image comprising a first rectilinear segment 7 representing the horizon line.

Figure 6:
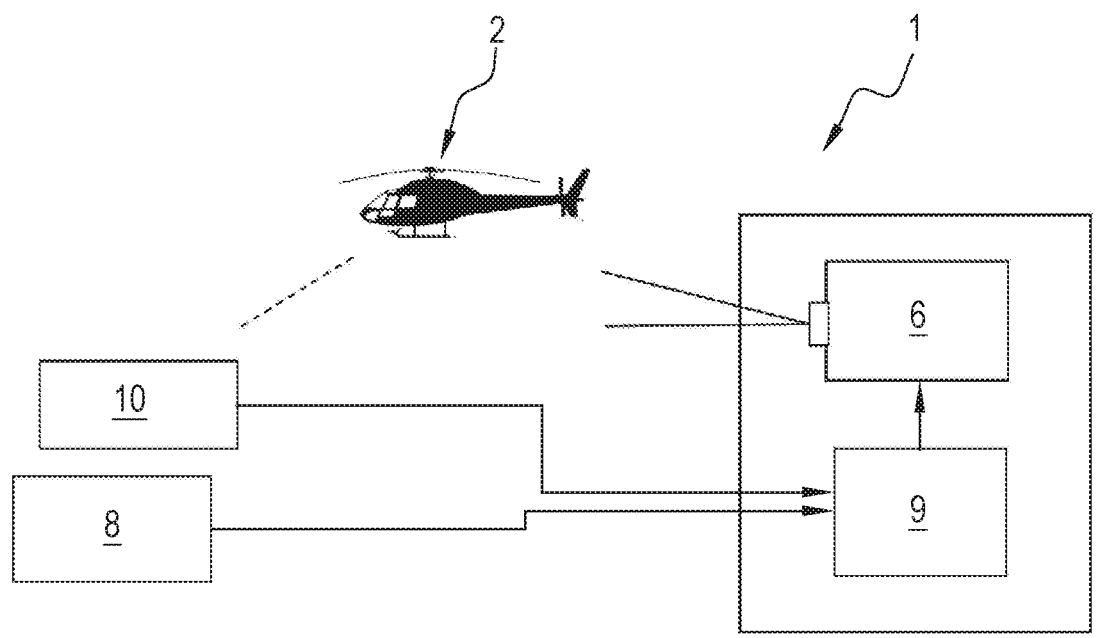
FIG. 6 is a schematic representation, by blocks, of the indicator device of the above-mentioned drawings.

As shown also in FIG. 6, the indicator device 1 comprises a unit 8 for measuring the instantaneous rolling motion angle of the ship 4.

The measuring unit 8, by comparison, instantaneously provides a signal identifying the inclination of the ship 4 relative to the horizon line.

The above-mentioned measuring unit 8 may be optionally an integral part of the navigation sensors of the ship.

The indicator device 1 also comprises a computerised command and control unit 9 which is operatively connected both to the projector 6 of images and the unit 8 for measuring the rolling motion angle.

The computerised command and control unit 9 is configured for transmitting the above-mentioned image for the projection by the projector 6 of the first rectilinear segment 7 representing the horizon line, thus modifying the angle on the non-horizontal wall 5 as a function of the instantaneous rolling motion angle of the measuring unit 8.

In other words, as illustrated in FIG. 1, the computerised command and control unit 9 is configured for modifying continuously the above-mentioned image so as to vary the angle of the first rectilinear segment 7 in accordance with the angle of rolling motion measured, in order to represent continuously on the non-horizontal wall 5 (and hence to the pilot of the aircraft who is making the landing) the real inclination of the ship 4 relative to the horizon line.

Figure 3:
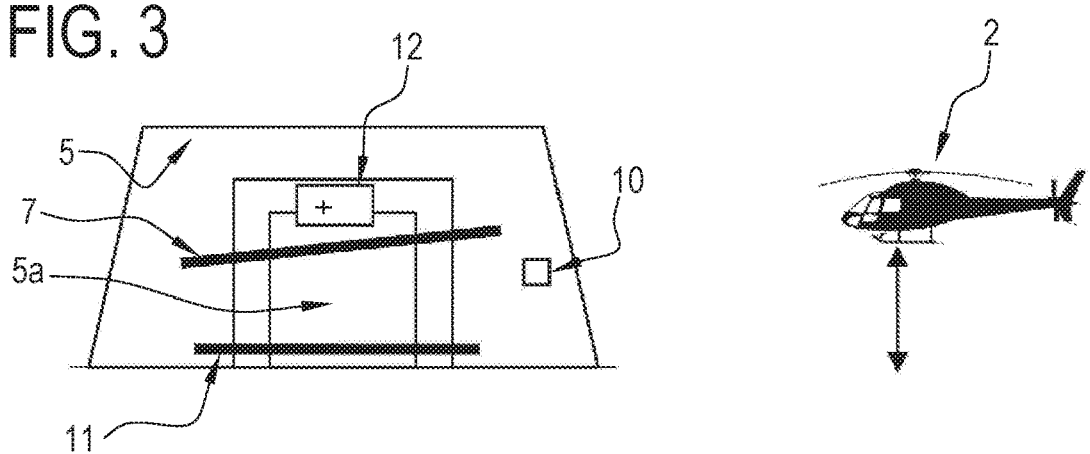
FIGS. 3 and 4 illustrate, in respective schematic front elevation views, a detail of the device of FIG. 1 in two relative different operating steps.
Figure 4:
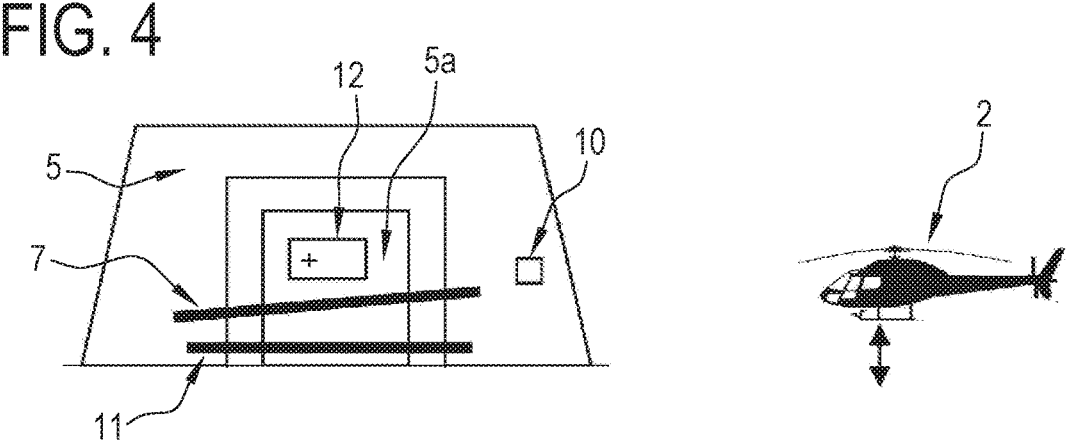

As indicated in FIGS. 3 and 4, the indicator device 1 comprises a sensor 10 for measuring the distance of the helicopter 2 approaching the deck 3 of the ship 4.

The sensor 10 for measuring the instantaneous distance is configured for generating a signal indicating the instantaneous height of the helicopter 2 from the deck 3 or, more specifically, from the landing surface S3.

The sensor 10 for measuring the distance is operatively connected to the above-mentioned computerised command and control unit 9.

In a variant embodiment of the invention described below, the measuring sensor 10 is also configured for providing the position of the helicopter relative to the plane of the surface S3.

As illustrated in FIGS. 1, 3 and 4, the image projected by the projector 6 on the above-mentioned non-horizontal wall 5 of the ship 4 comprises a second rectilinear segment 11.

The second rectilinear segment 11 is representative of a base line substantially parallel to a plane defined by the deck of the ship 4, a plane substantially coinciding with the above-mentioned landing surface S3.

As may be seen clearly in FIGS. 3 and 4, the second rectilinear segment 11 is located at a predetermined distance from the first rectilinear segment 7.

Advantageously, the second rectilinear segment 11 is located below the first rectilinear segment 7.

The first and second rectilinear segments 7, 11 are displayed on the non-horizontal wall 5 as luminous segments.

The above-mentioned predetermined distance, measured, for example, at the middle zone of the first rectilinear segment 7 is representative of the actual height of the aircraft 2 from the deck 3 of the ship 4, that is to say, from the landing surface S3.

Advantageously, the computerised command and control unit 9 is configured for modifying the above-mentioned predetermined distance between the first 7 and second 11 rectilinear segment, as a function of the signal emitted by the measuring sensor 10.

In other words, the computerised command and control unit 9, upon receiving from the measuring sensor 10 the distance signal indicating the instantaneous height of the helicopter 2 from the deck 3, updates the image projected by the projector 6 in such a way as to vary, consequently, the distance between the two above-mentioned first and second rectilinear segments 7, 11, so as to transmit to the pilot of the helicopter 2 a visual message representing the actual height of the helicopter 2 relative to the landing surface S3.

Advantageously, according to a preferred but not exclusive embodiment of the indicator device 1 according to the invention, the sensor 10 for measuring the distance is of the LIDAR type (Light Detection and Ranging or Laser Imaging Detection and Ranging), or the RADAR type (radio detection and ranging), that is to say, a sensor operating according to a remote measuring technique which makes it possible to determine the distance of an object using a laser or radio pulse. The two types of sensors may also be advantageously combined to increase the reliability of the measurement.

As illustrated in FIG. 1 and FIGS. 3 to 5, the above-mentioned luminous projector 6 is configured to project on the non-horizontal wall 5 of the ship 4 a portion of a luminous image, schematically illustrated in the above-mentioned drawings with a block 12.

This portion 12 of luminous image represents one between indications of landing zone limits, warning lights, alphanumeric information of operating and/or functional data relative to the status of the aircraft 2.

In other words, the portion 12 of luminous image is configured to project on the non-horizontal wall 5 information useful for the pilot during landing, which can be a simple representation of warning lights (red=stop; green=go) or alphanumeric indications regarding operational parameters of the ship 4, of the helicopter 2 or linked to the position of the latter (for example: actual height, engine revs etc.).

Amongst this information, the projection of the position of the helicopter on the plane of the landing surface may be advantageously represented in a visual manner by a point relative to references of the surface S3.

In essence, it is a plan view.

More specifically, the image of a cross represents the reference comprising the optimum position in the landing plane identified as an intersection between the segments of the cross, the point visually represents the relative position of the helicopter with respect to the optimum landing point. This image therefore provides a further guide for the pilot in locating the optimum landing position, generally at the centre of the surface S3.

Figure 5:
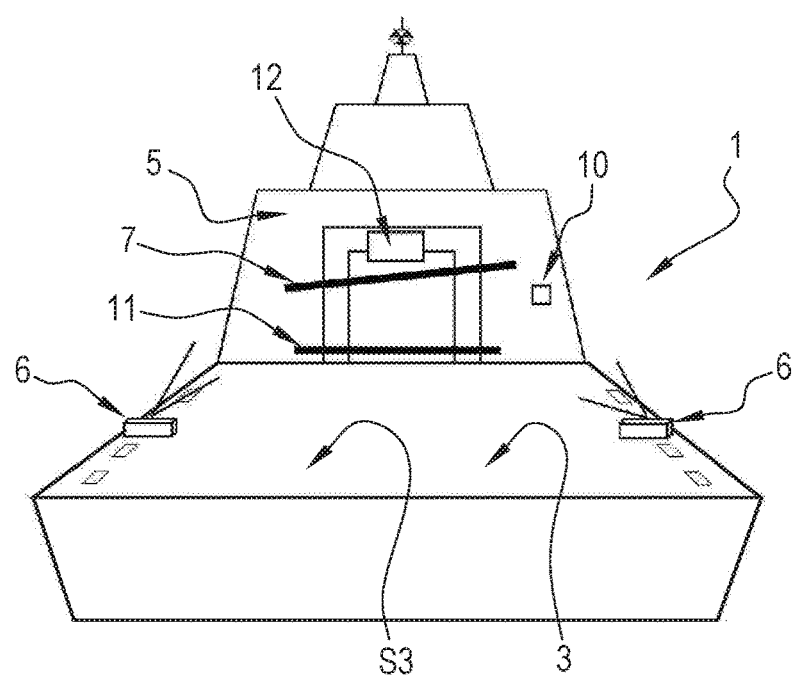
FIG. 5 is a schematic perspective view from above of another embodiment of the device of FIG. 1.

With reference to alternative embodiment of the indicator device 1 illustrated in FIG. 5, this comprises two luminous projectors 6.

With the adoption of several luminous projectors 6 positioned distributed on the deck 3 of the ship 4, the indicator device 1 according to the invention allows the projector(s) 6 closest to the actual landing position chosen by the pilot to be used.

This circumstance is, for example, useful in the presence of non-horizontal walls 5 for projection which are particularly large.

Further, with two or more projectors 6, the respective luminous beams emitted may superposed on each other, both to increase their intensity and to guarantee the redundancy often required for safety purposes.

For example, in the presence of particularly adverse weather conditions, the superposing of the luminous beams so as to increase the intensity without doubt allows a better reading by the pilot of the relative signals reflected on the non-horizontal wall 5.

The above-mentioned image projectors 6, regardless of whether they are one or more, define for the indicator device 1 according to this invention a relative projection apparatus.

According to the embodiments of the device 1 illustrated in the accompanying drawings, the projector(s) (6) of images is/are positioned on the deck 3 at the landing surface S3.

According to variant embodiments not illustrated but falling within the scope of this invention, one or more projectors 6 of images are positioned close to the above-mentioned non-horizontal wall 5, in a raised position with respect to the landing surface S3.

This positioning is advantageously achieved by means of supporting arms projecting from the wall 5.

This arrangement is advantageous with reference to the activities which are carried out on the deck 3 since it does not generate any obstruction on the landing surface S3.

A further advantage is due to the fact that since the projector(s) 6 is/are closer to the wall 5 the projection of the images is less exposed to the negative effects of the vapours present in the air, such as, for example, in the case of rain.

The invention also relates to a method for guiding the landing of an aircraft 2 on the deck 3 of a ship 4.

The method comprises the steps of:
measuring the instantaneous rolling motion angle of the ship 4,
projecting, on a non-horizontal wall 5 of the ship 4 a luminous image comprising a first segment 7 with a rectilinear extension representing the horizon line,
modifying the angle of the first segment 7 with rectilinear extension on the abovementioned non-horizontal wall 5 as a function of the instantaneous rolling motion angle measured.

The above-mentioned step of measuring the angle of rolling motion is carried out by the measuring unit 8.

The method according to the invention also advantageously comprises the steps of
measuring the distance of the aircraft 2 approaching the deck 3 of the ship 4,
obtaining from the distance measured the instantaneous height of the aircraft 2 from the deck 3 of the ship 4,
projecting on the above-mentioned non-horizontal wall 5 of the ship 4 a second rectilinear segment 11 representing a base line substantially parallel to a plane defined by the deck 3 of the ship 4, the second luminous beam 11 being located at a predetermined distance from the first luminous beam 7, representing the actual height of the aircraft 2 from the deck 3 of the ship 4,
modifying the predetermined distance between the first 7 and the second 11 luminous beam with a rectilinear extension according to the instantaneous height of the aircraft 2.

In practice, the landing aid visual indicator device 1 according to the invention is used, precisely, for guiding the landing of an aircraft 2 on the deck 3 of a ship 4.

The correct operation of the device 1 comprises measuring the instantaneous angle of rolling motion of the ship 4 by means of the above-mentioned measuring unit 8.

The computerised command and control unit 9 is programmed to handle the information received from the unit 8 for measuring the rolling motion angle and adjusting the image comprising the first luminous segment 7 with a rectilinear extension projected on the non-horizontal wall 5.

More precisely, the computerised command and control unit 9 is set up to receive information from the measuring unit 8, programmed for processing this information, and configured for generating an image (projected by the image projector 6) so as to vary continuously the inclination of the first rectilinear segment 7.

In practical terms, the computerised unit 9 modifies the inclination of the first segment 7 in such a way as to ensure that the image which forms on the non-horizontal wall 5 by reflection from the luminous beam generated by the projector 6 reproduces the inclination.

The image projected of the first segment 7 adopts the aspect of a bar.

The instantaneous height of the aircraft 2 is therefore measured relative to the deck 3 of the ship 4 by the above-mentioned sensor 10 for measuring the distance.

As illustrated in FIGS. 1, 3 and 4, the image projected by the projector 6 on the above-mentioned non-horizontal wall 5 of the ship 4 comprises a second rectilinear segment 11.

The computerised command and control unit 9 is programmed to handle the information received from the sensor 10 for measuring the distance and modifying, in the image to be projected on the non-horizontal wall 5, the aspect of the first rectilinear segment 7.

More specifically, the computerised command and control unit 9 is set up to receive information from the sensor 10 for measuring the distance, programmed for processing this information to obtain the value of the height of the aircraft 2 from the landing surface S3, and configured for modifying inside the image to be projected the position of the first rectilinear segment 7, that is, varying the height.

Advantageously, with the presence inside the same image to be projected of the second rectilinear segment 11 (the image of which reflected on the non-horizontal wall 5 adopts the aspect of a bar, referred to also as base line), the computerised command and control unit 9 varies, in the image, the distance of the first segment 7 from the second segment 11, so that the variation of actual height of aircraft 2 from the landing surface S3 can be immediately perceived in real time by the pilot making the landing.

Advantageously, the projector 6 of images projects, as mentioned, on the non-horizontal wall 5 of the ship 4, the above-mentioned portion 12 of luminous image, representing one between indications of warning lights, projection of the position of the helicopter relative to the surface S3, alphanumeric information of operating data and/or functional relative to the status of the aircraft 2.

The computerised command and control unit 9 is programmed to handle the information received from the aircraft 2 or from further devices on-board the ship 4, and compose them in the portion 12 of image which the projector 6 projects on the non-horizontal wall 5.

According to the preferred embodiment illustrated in FIGS. 3 and 4, the computerised command and control unit 9 is configured to vary the position of the above-mentioned portion 12 of image inside the overall image projected so as to vary the height on the non-horizontal wall 5 in accordance with the variation the height of the aircraft 2 from the deck 3 of the ship 4.

An additional function of the command and control unit 9 with respect to creation of the above-mentioned units to display to the pilot is that of adapting the image produced by the projector 6 of images to compensate for reflection or shape irregularities of the projection surface consisting of the non-horizontal wall 5.

This surface is not, in effect, typically set up for this purpose and may contain objects or surfaces which are not flat which, once reflected, have variations of luminous intensity or shape deformations in how they are perceived by the pilot. To compensate for these alterations in the reflection, the computerised command and control unit 9 stores the map of the alterations of the surface and produces an image to be projected which is modified to contain an opposite alteration.

That is to say, an increase in the light intensity where the reflection is lower and a shape modification there is a non-flat surface.

The landing surface S3 is generally free of personnel during the manoeuvres. To prevent any persons who may be present from being dazzled by the luminous beam of the image projected, the indicator system 1 according to the invention can be configured in such a way that the presence is detected and the image projected by the projector 6 is obscured in the zone of presence of the persons.

The sensor 8 equipped with technology for measuring the presence of objects, such as the helicopter 2, determines the position of persons and the computerised command and control unit 9 modifies the image in such a way as to blacken the portion of image whose luminous beam is located along the line between the projector and projection surface on the wall 5.

The invention achieves the proposed aims and brings important advantages.

A first advantage connected to the adoption of the indicator device 1 according to the invention is due to the evident reduction in work load for the pilot who consults a plurality of information grouped together and always located in the most visible position for the pilot.

In addition, the same information is also optimised in terms of perception as it can in fact be adapted to the intensity of the light beams according to the actual visibility requirements.

A further advantage is connected to the possibility to maximise the dimensions of the signals displayed as they are not constrained by physical entities, such as, for example, the luminous bars known in the prior art.

Yet another advantage of the indicator device 1 according to the invention consists in its compactness, and its limited size, requiring in effect, in the proximity of the landing zone, simply the physical presence of one or more luminous projectors 6, which are even located in marginal positions.

Another advantage again linked to the use of the indicator device 1 according to the invention is due to its tendency to adapt to the real position of the aircraft approaching, being able, in effect, to both select the projector(s) 6 most suitable for the actual situation and select the preferred zone of the non-horizontal wall 5 in which to display the images with information for the pilot.

Generally speaking, the indicator device 1 according to the invention advantageously allows the luminous signals to be configured in a dynamic manner, in terms of the type, number and position of the information transmitted to the pilot, in such a way as to also locate it in the zone most useful for the pilot during the landing manoeuvres.

The invention claimed is:

1. A visual indicator device for landing aircraft on a deck of a ship, comprising:
   a unit for measuring an instantaneous plan position of the aircraft;
   a projection apparatus configured to project, on a non-horizontal wall of the ship, at least a portion of an image representing the instantaneous plan position of the aircraft with respect to an optimum landing position;
   a computerised command and control unit, operatively connected to the projection apparatus, configured to adjust the projection by the apparatus for projection of the image, as a function of the instantaneous plan position of the aircraft with respect to the optimum landing position.

2. The device according to claim 1, wherein it comprises a sensor for measuring the distance of an aircraft approaching the deck of the ship, configured for generating a signal indicating the instantaneous height of the aircraft from the deck of the ship, the measurement sensor being operatively connected to the computerised command and control unit.

3. The device according to claim 2, wherein the sensor for measuring the distance is a LIDAR sensor.

4. The device according to claim 2, comprising a measurement unit for measuring the instantaneous rolling motion angle of the ship, wherein said a projection apparatus is designed to project, on said non-horizontal wall of the ship, at least one image comprising a first segment with a rectilinear extension representing the horizon line, wherein said computerised command and control unit is operatively connected to said measurement unit and is configured to adjust the projection by the apparatus for projection of the image, modifying the angle of the first segment with rectilinear extension on the non-horizontal wall as a function of the instantaneous rolling motion angle measured by said measurement unit.

5. The device according to claim 4, wherein the projection apparatus is configured to project on the non-horizontal wall of the ship a second segment with a rectilinear extension, representing a base line substantially parallel to a plane defined by the deck of the ship and located at a predetermined distance from the first luminous segment, the predetermined distance representing the actual height of the aircraft from the deck of the ship.

6. The device according to claim 5, wherein the computerised operational command and control unit is configured for modifying the predetermined distance between the first and second rectilinear segment, as a function of the signal emitted by the measuring sensor.

7. The device according to claim 1, wherein the projection apparatus is configured for projecting on the non-horizontal wall of the ship a portion of an image representing one between indications of landing zone limits, warning lights, alphanumeric information of operating and/or functional data relative to the status of the aircraft.

8. The device according to claim 1, wherein the projection apparatus comprises a plurality of projectors of images designed to be positioned distributed on the deck of a ship.

9. The device according to claim 1, wherein the projection apparatus comprises one or more projectors of images positioned in a raised position close to the non-horizontal wall.

10. A ship comprising:
a deck for the landing of aircraft,
a non-horizontal wall bordered by the deck,
an aircraft landing aid visual indicator device made in accordance with claim 1.

11. The ship according to claim 10, wherein the non-horizontal wall is a substantially vertical wall.

12. A method for guiding a landing of an aircraft on a deck of a ship, comprising the steps of:
measuring an instantaneous plan position of the aircraft;
projecting, on a non-horizontal wall of the ship, at least a portion of an image representing the instantaneous plan position of the aircraft with respect to the optimum landing position,
modifying said at least a portion of an image as a function of the instantaneous plan position of the aircraft with respect to the optimum landing position.

13. The method according to claim 12, wherein it comprises a step of preparing a visual indicator device.

14. The method according to claim 12, comprising the following step:
measuring the instantaneous rolling motion angle of the ship,
projecting, on said non-horizontal wall of the ship, a luminous image comprising a first segment with a rectilinear extension representing the horizon line,
modifying the angle of the first segment on the non-horizontal wall as a function of the instantaneous rolling motion angle measured.

15. The method according to claim 14, wherein it comprises the steps of:
measuring the distance of an aircraft approaching the deck of the ship,
obtaining from the distance measured the instantaneous height of the aircraft from the deck of the ship,
projecting on the non-horizontal wall of the ship a second segment with a rectilinear extension representing a base line substantially parallel to a plane defined by the deck of the ship and located at a predetermined distance from the first segment, representing the actual height of the aircraft from the deck of the ship,
modifying the predetermined distance between the first and the second segment with a rectilinear extension according to the instantaneous height of the aircraft.

\* \* \* \* \*